United States Patent
Rainer et al.

(10) Patent No.: US 8,388,072 B2
(45) Date of Patent: Mar. 5, 2013

(54) CRAWLER VEHICLE TRACK GROUSER

(75) Inventors: Hermann Rainer, Vipiteno (IT); Martin Kirchmair, Pfons (AT)

(73) Assignee: Rolic Invest S.AR.L., Luxembourg (LU)

( * ) Notice: Subject to any disclaimer, the term of this patent is extended or adjusted under 35 U.S.C. 154(b) by 360 days.

(21) Appl. No.: 12/665,640

(22) PCT Filed: Jun. 20, 2008

(86) PCT No.: PCT/EP2008/057915
§ 371 (c)(1),
(2), (4) Date: May 21, 2010

(87) PCT Pub. No.: WO2008/155425
PCT Pub. Date: Dec. 24, 2008

(65) Prior Publication Data
US 2010/0225160 A1    Sep. 9, 2010

(30) Foreign Application Priority Data

Jun. 21, 2007    (IT) .............................. MI2007A1249

(51) Int. Cl.
*B62D 55/28*    (2006.01)
(52) U.S. Cl. ........................................ 305/191; 305/180
(58) Field of Classification Search ................. 305/157, 305/160, 178, 179, 180, 191
See application file for complete search history.

(56) References Cited

U.S. PATENT DOCUMENTS

| | | | |
|---|---|---|---|
| 1,536,604 A * | 5/1925 | Bentson | ........................ 305/191 |
| 3,170,533 A | 2/1965 | Fewel et al. | |
| 3,227,295 A | 1/1966 | Hamilton et al. | |
| 3,382,943 A * | 5/1968 | Anderson | ....................... 180/9.1 |
| 3,386,778 A | 6/1968 | Rymes | |
| 3,489,466 A * | 1/1970 | Moxley | .......................... 305/106 |
| 3,534,701 A | 10/1970 | Hebert | |
| 3,623,779 A * | 11/1971 | Schmidt, Jr. | ................... 305/101 |
| 3,637,267 A * | 1/1972 | Bombardier et al. | .......... 305/160 |
| 3,692,132 A | 9/1972 | Pollanen | |
| 3,726,569 A * | 4/1973 | Maglio et al. | ................. 305/164 |
| 3,763,944 A | 10/1973 | Kaltenegger | |
| 4,087,135 A | 5/1978 | Unruh | |
| 4,348,825 A | 9/1982 | Bachler | |

(Continued)

FOREIGN PATENT DOCUMENTS

| | | |
|---|---|---|
| CA | 2211050 | 1/1998 |
| CA | 2443765 A1 | 4/2004 |

(Continued)

OTHER PUBLICATIONS

PistenBully 600 brochure, written by Kassbohrer Gelandefahrzeug AG, published in Mar. 2010.

(Continued)

*Primary Examiner* — Kip T Kotter
(74) *Attorney, Agent, or Firm* — Neal, Gerber & Eisenberg LLP

(57) ABSTRACT

A grouser for crawler vehicle tracks defined by a fastening member which extends in a first direction substantially crosswise to a second traveling direction of a track, is fixed to at least one supporting belt of the track, and has an inner cavity open laterally in the first direction. The grouser includes a toothed gripping member projecting from the fastening member to grip the terrain. The grouser also includes two plugs for closing the inner cavity laterally in the first direction.

26 Claims, 3 Drawing Sheets

U.S. PATENT DOCUMENTS

| | | | |
|---|---|---|---|
| 4,458,954 A | 7/1984 | Haas | |
| 4,458,955 A | 7/1984 | Webb | |
| 4,500,139 A | 2/1985 | Tucek | |
| 4,788,783 A | 12/1988 | Bachler | |
| 4,846,092 A * | 7/1989 | Wilson | 440/12.64 |
| 5,062,493 A | 11/1991 | Platter et al. | |
| 5,067,263 A | 11/1991 | Pelletier | |
| 5,354,124 A * | 10/1994 | James | 305/162 |
| 6,155,363 A | 12/2000 | Matsumoto et al. | |
| 6,296,330 B1 | 10/2001 | Hall | |
| 6,354,023 B1 | 3/2002 | Trahan et al. | |
| 6,418,645 B1 | 7/2002 | Hammerle et al. | |
| 6,540,310 B1 * | 4/2003 | Cartwright | 305/180 |
| 6,637,134 B2 | 10/2003 | Hammerle | |
| 6,810,609 B2 | 11/2004 | Lassonde et al. | |
| 6,921,304 B2 | 7/2005 | Hewitt | |
| 6,983,927 B2 | 1/2006 | Pelletier et al. | |
| 7,464,699 B2 | 12/2008 | Joppig et al. | |
| 7,530,547 B2 | 5/2009 | Leitner et al. | |
| 2002/0139013 A1 | 10/2002 | Hammerle | |
| 2003/0051376 A1 | 3/2003 | Lassonde et al. | |
| 2003/0159840 A1 | 8/2003 | Schmidt, Jr. | |
| 2004/0069981 A1 | 4/2004 | Pelletier et al. | |
| 2005/0252592 A1 | 11/2005 | Albright et al. | |
| 2005/0279980 A1 | 12/2005 | Leitner et al. | |
| 2007/0130806 A1 | 6/2007 | Goodman | |
| 2008/0257616 A1 | 10/2008 | Olsson | |
| 2008/0269986 A1 | 10/2008 | Regnell et al. | |
| 2008/0309157 A1 | 12/2008 | Runggaldier et al. | |
| 2009/0000833 A1 | 1/2009 | Dorais et al. | |
| 2009/0007461 A1 | 1/2009 | Pelletier et al. | |
| 2009/0013562 A1 | 1/2009 | Pelletier | |

FOREIGN PATENT DOCUMENTS

| | | |
|---|---|---|
| DE | 2145772 | 3/1973 |
| DE | 2148304 | 4/1973 |
| DE | 2219623 | 11/1973 |
| DE | 2254276 | 5/1974 |
| DE | 3440491 | 5/1986 |
| DE | 3534626 | 3/1987 |
| DE | 29515866 | 1/1996 |
| DE | 29603251 | 4/1996 |
| DE | 10320523 | 11/2004 |
| EP | 0551160 A1 | 7/1993 |
| EP | 1405782 | 4/2004 |
| EP | 1674382 A1 | 10/2005 |
| EP | 1591350 A2 | 11/2005 |
| EP | 1827954 B1 | 12/2005 |
| EP | 1995159 A1 | 6/2007 |
| EP | 1872683 A1 | 1/2008 |
| EP | 1908673 B1 | 9/2009 |
| EP | 1908672 B1 | 4/2010 |
| FR | 2336292 | 7/1977 |
| FR | 2536437 | 5/1984 |
| FR | 2586727 | 3/1987 |
| GB | 1590358 | 6/1981 |
| JP | 01144287 | 10/1989 |
| JP | 03182887 | 8/1991 |
| JP | 7237566 | 9/1995 |
| WO | WO2005093173 | 10/2005 |
| WO | WO 2006/069671 | 7/2006 |
| WO | WO 2006/069682 | 7/2006 |
| WO | WO2008114138 | 9/2008 |
| WO | WO2008155423 | 12/2008 |
| WO | WO2009034183 | 3/2009 |
| WO | WO2009034185 | 3/2009 |
| WO | WO2009056576 | 5/2009 |
| WO | WO2009056577 | 5/2009 |
| WO | WO2009056578 | 5/2009 |
| WO | WO2009056579 | 5/2009 |

OTHER PUBLICATIONS

PistenBully Scout brochure, written by Kassbohrer Gelandefahrzeug AG, published in Jan. 2010.

* cited by examiner

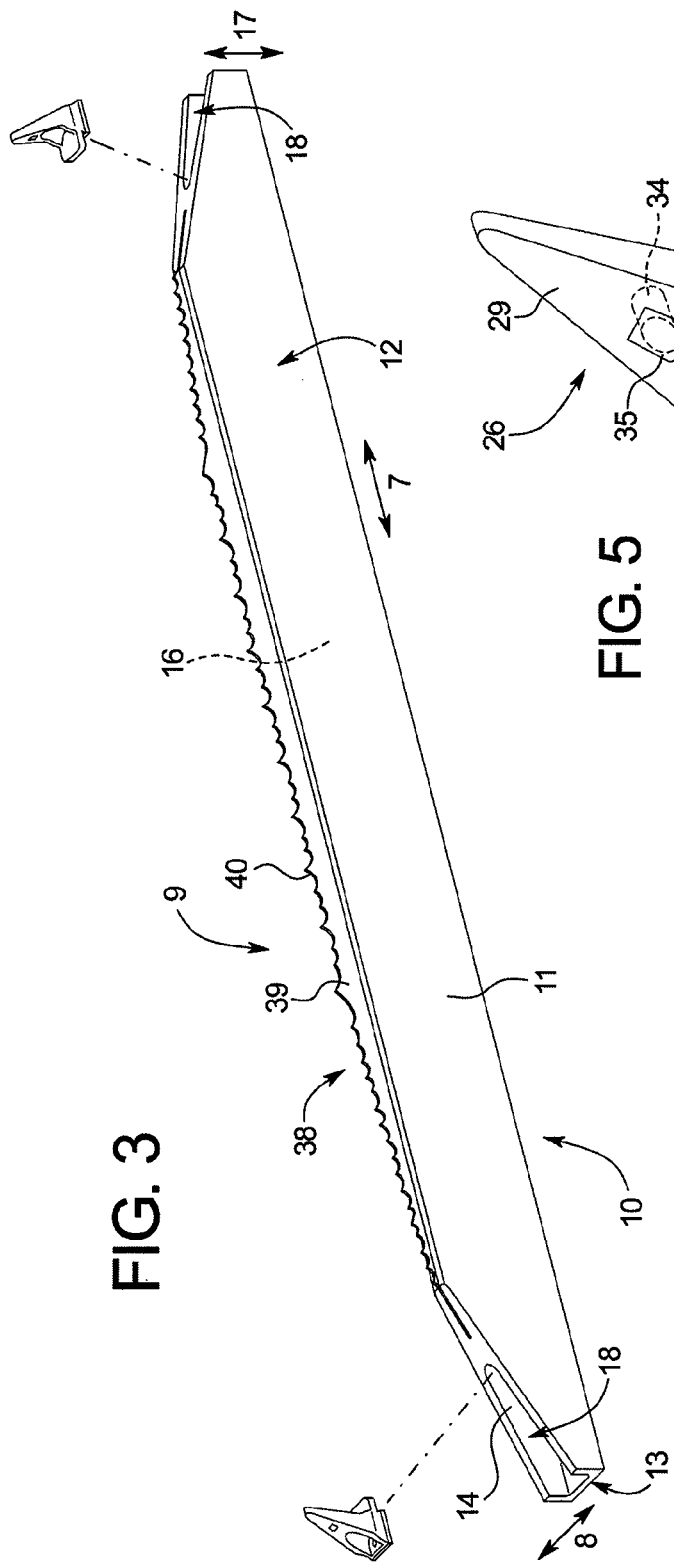

CRAWLER VEHICLE TRACK GROUSER

PRIORITY CLAIM

This application is a national stage application of PCT/EP2008/057915, filed Jun. 20, 2008, which claims the benefit of and priority to Italian Patent Application No. MI2007A 001249, filed on Jun. 21, 2007, the entire contents of which are incorporated herein.

TECHNICAL FIELD

The present disclosure relates to a crawler vehicle track grouser and particularly to a track grouser for snow groomers.

BACKGROUND

Snow groomers are known to comprise a track in turn comprising a number of grousers extending in a first direction substantially crosswise to a second traveling direction of the track, and fixed to a number of parallel flexible supporting belts looped about a number of pulleys.

Certain known grousers include a fastening member extending in the first direction, fixed to at least one supporting belt, and having an inner cavity open laterally in the first direction; and a toothed gripping member extending along at least part of, and projecting from, the fastening member, and by which the grouser grips the terrain.

These known tracks have various drawbacks, mainly due to the inner cavities of the fastening members filling with snow and/or ice on the ski runs, thus increasing the weight of the grousers and impairing operation of the tracks.

Moreover, when the fastening members are made of steel, these known tracks have the further drawback of the snow and/or ice inside the inner cavities of the fastening members corroding the grousers, and so fouling the ski runs with rust-colored liquid.

SUMMARY

It is an object of the present disclosure to provide a crawler vehicle track grouser, particularly for snow groomers, designed to eliminate the above drawbacks, and which is inexpensive and easy to produce.

According to various embodiments of the present disclosure, there is provided a crawler vehicle track grouser, particularly for snow groomers, including a fastening member fixed to at least one supporting belt of a track, the fastening member extending in a first direction substantially crosswise to a second traveling direction of the track, and having an inner cavity open laterally in the first direction. The crawler vehicle track grouser also includes two plugs configured to close the inner cavity laterally in the first direction; and a toothed gripping member configured to grip terrain, the toothed gripping member extending along at least part of the fastening member and projecting from the fastening member.

Additional features and advantages are described in, and will be apparent from, the following Detailed Description and the figures.

BRIEF DESCRIPTION OF THE DRAWINGS

A non-limiting embodiment of the present invention will be described by way of example with reference to the accompanying drawings, in which:

FIG. 3 shows a first schematic view in perspective of a detail in FIG. 2;

FIG. 5 shows a view in perspective of a detail in FIG. 3.

DETAILED DESCRIPTION

Figure 1:
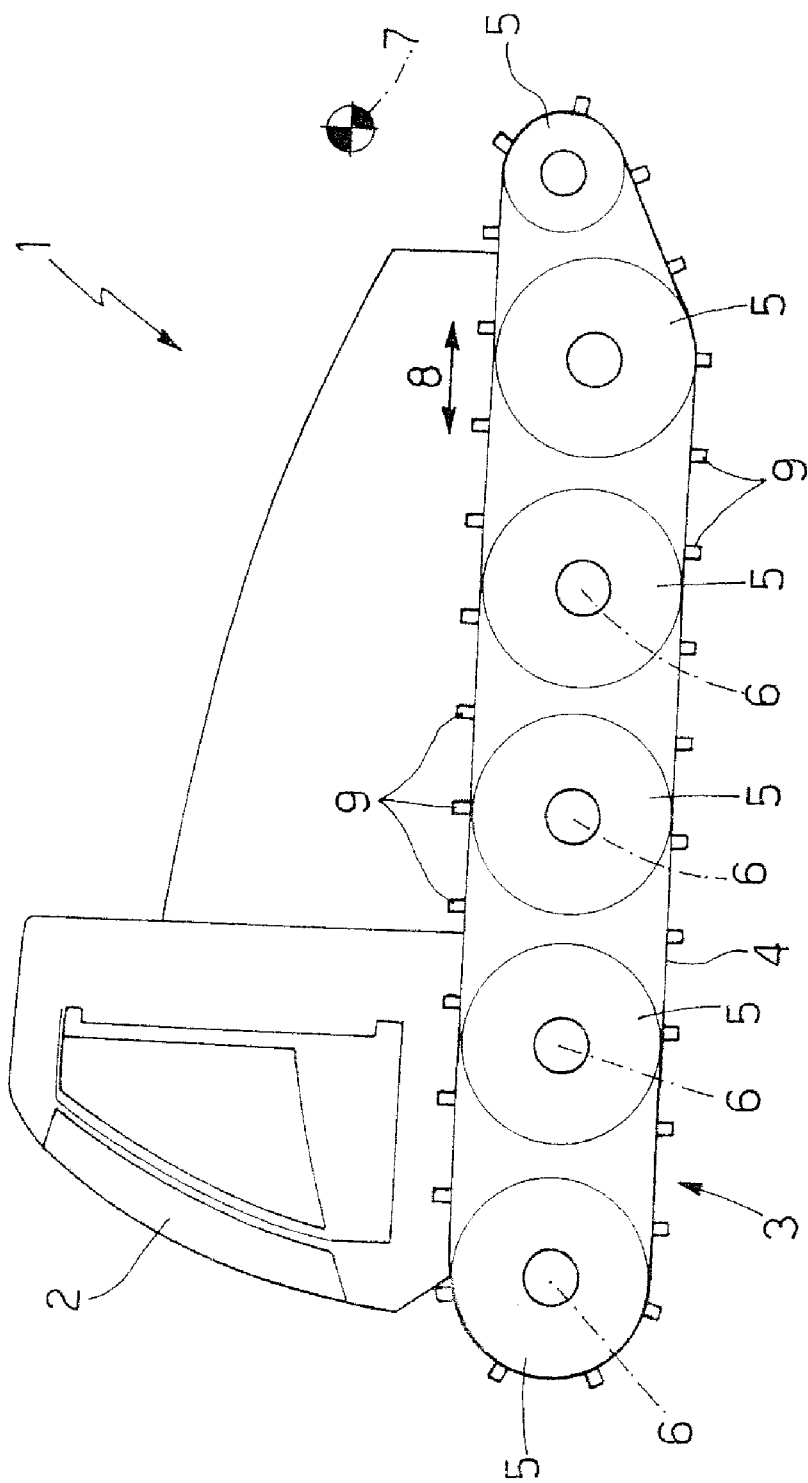
FIG. 1 shows a schematic side view of a snow groomer featuring one embodiment of the track grouser according to the present disclosure.

Referring now to the example embodiments of the present disclosure illustrated in FIGS. 1 to 5, number 1 in FIG. 1 indicates as a whole a snow groomer comprising a cab 2, and a track 3 by which to propel groomer 1.

Track 3 comprises a number of flexible supporting belts 4 (only one shown in FIG. 1), which are normally made of rubber, extend in respective substantially parallel vertical planes, and are looped about a number of pulleys 5 rotated, by a known drive device (not shown), about respective axes 6 parallel to one another and to a direction 7 substantially crosswise to the traveling direction 8 of track 3.

Track 3 also comprises a number of substantially parallel grousers 9, which extend in direction 7, and are equally spaced along and fastened to belts 4.

Figure 4:
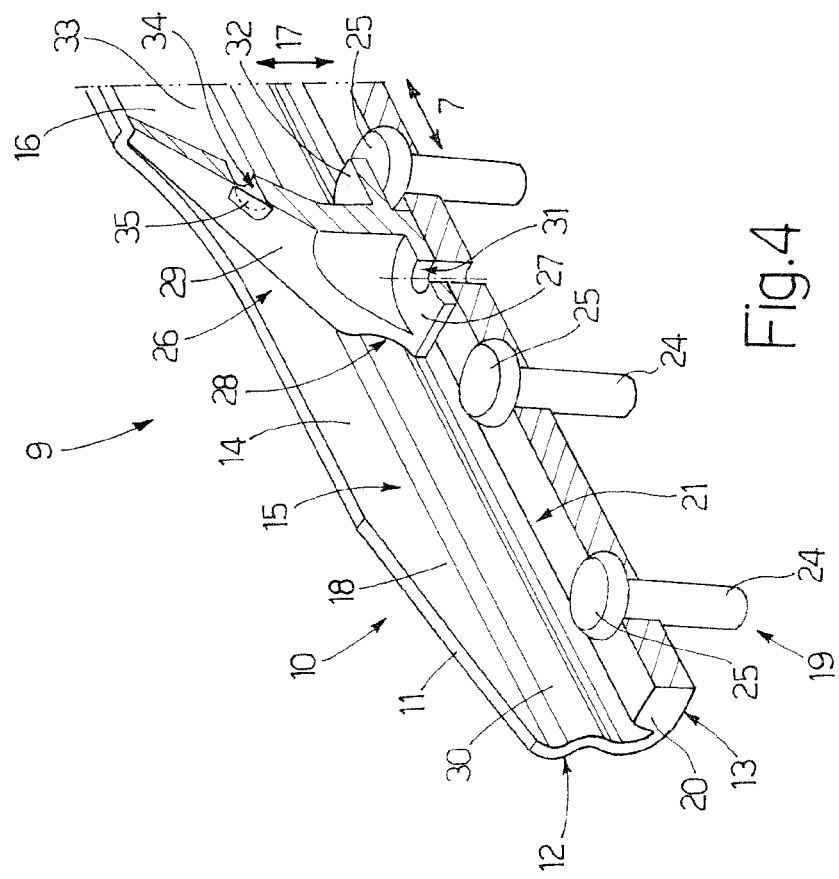
FIG. 4 shows a partly sectioned second schematic view in perspective of the FIG. 3 detail.
Figure 2:
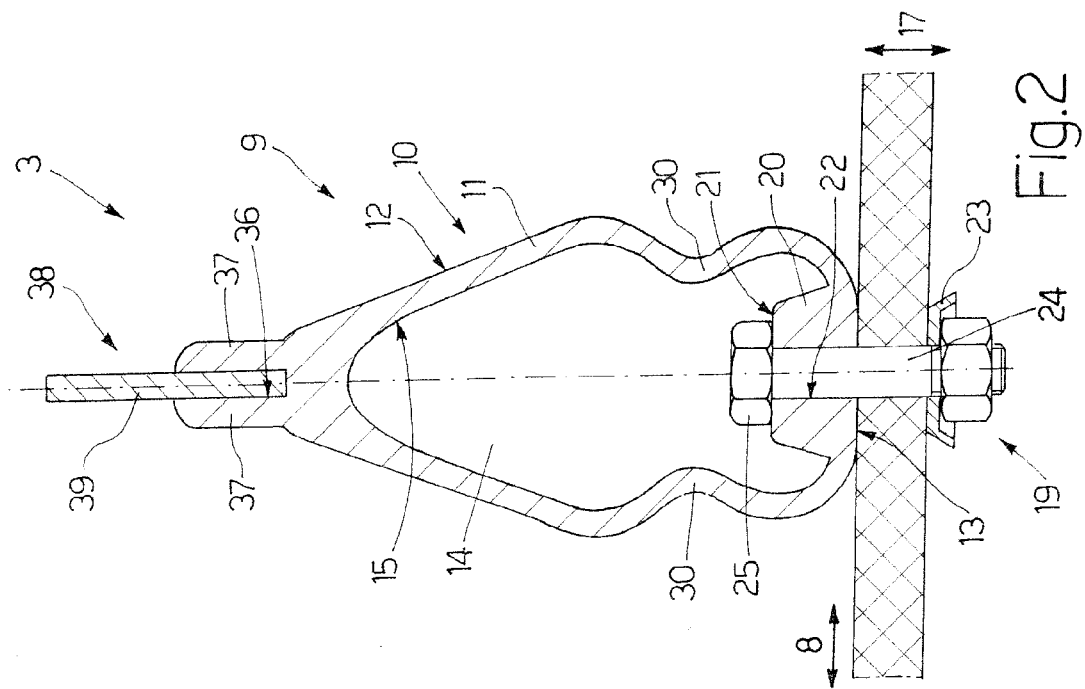
FIG. 2 shows a schematic cross section of a detail in FIG. 1.

As shown in FIGS. 2, 3 and 4, each grouser 9 comprises an elongated fastening member 10 defined by a contoured bar 11, which extends in direction 7, is normally made of steel or aluminum, is bounded by an outer surface 12 comprising a substantially flat portion 13 resting on a number of belts 4, depending on the length of bar 11, and has an inner cavity 14 open laterally in direction 7 and bounded by a contoured inner surface 15.

Cavity 14 comprises a central portion 16 closed in a direction 17 substantially perpendicular to portion 13 and to directions 7 and 8; and two lateral portions 18 located on opposite sides of central portion 16 in direction 7 and open in direction 17.

Bar 11 is fixed to belts 4 by a fastening device 19 comprising an elongated tooth 20, which extends inside cavity 14, at portion 13 and in direction 7, projects in direction 17 from surface 15, is formed in one piece with bar 11 in the example shown, is bounded by a substantially flat free surface 21 parallel to and opposite portion 13, and has a number of knurled holes 22 formed through tooth 20 in direction 17.

Device 19 also comprises a plate 23 resting on belts 4, on the opposite side to bar 11, and which is secured to belts 4 and bar 11 by a number of bolts 24 locked axially inside knurled holes 22 in direction 17 and having respective heads 25 substantially contacting surface 21.

With reference to FIGS. 4 and 5, cavity 14 is closed laterally in direction 7 by two plugs 26, each of which comprises a substantially parallelepiped-shaped portion 27 with two opposite grooves or engagers 28 parallel to direction 7; and a substantially triangular sloping portion 29 projecting from portion 27 at an angle of other than 90 degrees.

The two grooves 28 engage and slide along respective runners 30 formed parallel to direction 7 on surface 15, to slide relative plug 26 into a closed position (FIG. 4) in which plug 26 is positioned between central portion 16 and a relative lateral portion 18 to close cavity 14.

Each plug 26 is locked in the closed position by a locking member, such as one or more screws (not shown) engaging a hole 31 formed through portion 27 and parallel to direction 17, and has a flat flange 32 which rests on head 25 of a bolt 24.

Central portion 16 and the two plugs 26 define a substantially closed chamber 33 communicating with the outside via two relief conduits 34, each of which is formed through portion 29 of a relative plug 26 in direction 7, and communicates externally with the interposition of a flap 35 formed on portion 29 and movable into an open position opening conduit 34 by the air inside chamber 33.

In a variation not shown, the open lateral portions 18 are eliminated, cavity 14 is defined solely by closed central portion 16, and plugs 26 are fitted to the free ends of central portion 16.

Bar 11 also has a cavity 36, which is located opposite the portion fastening bar 11 to belts 4, extends along central portion 16 in direction 7, opens outwards at surface 12, and is bounded laterally in direction 8 by two flat ribs 37 substantially parallel to each other and to direction 7.

Cavity 36 houses an elongated gripping member 38 defined in the example shown by a substantially flat plate 39, which is connected in known manner to bar 11, projects outwards of cavity 36, and has a toothed edge 40 for improving grip of grouser 9 to the terrain.

In variations not shown, cavity 36 is replaced by a seat formed directly on surface 12, or fastening member 10 and gripping member 38 are formed in one piece.

Plugs 26 prevent cavity 14 from filling with snow and/or ice on the ski runs, and so prevent increasing the weight of grouser 9, as well as corrosion of grouser 9 resulting in fouling of the ski runs with rust-colored liquid.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A crawler vehicle track grouser comprising:
  a fastening member fixed to at least one supporting belt of a track, said fastening member:
    (i) extending in a first direction substantially crosswise to a second traveling direction of the track, and
    (ii) having an inner cavity open laterally in said first direction;
  a toothed gripping member configured to grip terrain, said toothed gripping member extending along at least part of the fastening member and projecting from the fastening member; and
  two plugs configured to close the inner cavity laterally in said first direction, wherein the two plugs and the inner cavity define a substantially closed chamber, and at least one of the plugs has:
    (i) a relief conduit configured to exhaust air from the chamber, and
    (ii) a cover which is movable by the air inside the chamber into an open position to open the relief conduit.

2. The crawler vehicle track grouser of claim 1, wherein the inner cavity has at least one runner extending in said first direction and each of said plugs include at least one engager configured to engage the at least one runner and slide along the at least one runner.

3. The crawler vehicle track grouser of claim 1, which includes at least one locking member configured to lock at least one of the plugs along the inner cavity in said first direction.

4. The crawler vehicle track grouser of claim 1, wherein the inner cavity includes:
  a central portion closed in a third direction which is substantially perpendicular to said first direction and said second direction; and
  two lateral portions open in the third direction, wherein each of said plugs is located between the central portion and a relative one of said lateral portions.

5. The crawler vehicle track grouser of claim 1, wherein the inner cavity has two lateral ends open in said first direction, and each of the plugs is located at a relative one of said lateral ends.

6. The crawler vehicle grouser of claim 1, wherein the track is a snow groomer track.

7. A crawler vehicle track comprising:
  at least one supporting belt looped about a plurality of pulleys; and
  at least one grouser including:
    a fastening member fixed to said at least one supporting belt, said fastening member:
      (i) extending in a first direction substantially crosswise to a second traveling direction, and
      (ii) having an inner cavity open laterally in said first direction;
    a toothed gripping member configured to grip terrain, said toothed gripping member extending along at least part of the fastening member and projecting from the fastening member; and
    two plugs configured to close the inner cavity laterally in said first direction, wherein the two plugs and the inner cavity of said at least one grouser define a substantially closed chamber, and at least one of the plugs has:
      (i) a relief conduit configured to exhaust air from the chamber, and
      (ii) a cover which is movable by the air inside the chamber into an open position to open the relief conduit.

8. The crawler vehicle track of claim 7, wherein said at least one supporting belt is at least one snow groomer supporting belt.

9. The crawler vehicle track of claim 7, wherein the inner cavity of said at least one grouser has at least one runner extending in said first direction and each of said plugs include at least one engager configured to engage the at least one runner and slide along the at least one runner.

10. The crawler vehicle track of claim 7, wherein said at least one grouser includes at least one locking member configured to lock at least one of the plugs along the inner cavity in said first direction.

11. The crawler vehicle track of claim 7, wherein the inner cavity of said at least one grouser includes:
  a central portion closed in a third direction which is substantially perpendicular to said first direction and said second direction; and
  two lateral portions open in the third direction, wherein each of said plugs is located between the central portion and a relative one of said lateral portions.

12. The crawler vehicle track of claim 7, wherein the inner cavity of said at least one grouser has two lateral ends open in said first direction, and each of the plugs is located at a relative one of said lateral ends.

13. A crawler vehicle track grouser comprising:
  a fastening member fixed to at least one supporting belt of a track, said fastening member:
    (i) extending in a first direction substantially crosswise to a second traveling direction of the track,
    (ii) having an inner cavity open laterally in said first direction, and (iii) including a plurality of holes, each of the holes configured to receive and house a respective bolt which is configured to fasten the fastening member to said at least one supporting belt;

two plugs configured to close the inner cavity laterally in said first direction, each of the plugs including a flange which projects from said plug in said first direction to rest on a head of a respective one of the bolts; and a toothed gripping member configured to grip terrain, said toothed gripping member extending along at least part of the fastening member and projecting from the fastening member.

14. The crawler vehicle track grouser of claim 13, wherein the inner cavity has at least one runner extending in said first direction and each of said plugs include at least one engager configured to engage the at least one runner and slide along the at least one runner.

15. The crawler vehicle track grouser of claim 13, wherein each of said plugs includes a substantially parallelepiped-shaped first portion, and a substantially triangular second portion projecting from the first portion.

16. The crawler vehicle track grouser of claim 13, which includes at least one locking member configured to lock at least one of the plugs along the inner cavity in said first direction.

17. The crawler vehicle track grouser of claim 13, wherein the inner cavity includes:
a central portion closed in a third direction which is substantially perpendicular to said first direction and said second direction; and
two lateral portions open in the third direction, wherein each of said plugs is located between the central portion and a relative one of said lateral portions.

18. The crawler vehicle track grouser of claim 13, wherein the inner cavity has two lateral ends open in said first direction, and each of the plugs is located at a relative one of said lateral ends.

19. The crawler vehicle grouser of claim 13, wherein the track is a snow groomer track.

20. A crawler vehicle track comprising:
at least one supporting belt looped about a plurality of pulleys; and
at least one grouser including:
a fastening member fixed to said at least one supporting belt, said fastening member:
(i) extending in a first direction substantially crosswise to a second traveling direction,
(ii) having an inner cavity open laterally in said first direction, and
(iii) including a plurality of holes, each of the holes configured to receive and house a respective bolt which is configured to fasten the fastening member to said at least one supporting belt;

two plugs configured to close the inner cavity laterally in said first direction, each of the plugs including a flange which projects from said plug in said first direction to rest on a head of a respective one of the bolts; and a toothed gripping member configured to grip terrain, said toothed gripping member extending along at least part of the fastening member and projecting from the fastening member.

21. The crawler vehicle track of claim 20, wherein said at least one supporting belt is at least one snow groomer supporting belt.

22. The crawler vehicle track of claim 20, wherein the inner cavity of said at least one grouser has at least one runner extending in said first direction and each of said plugs include at least one engager configured to engage the at least one runner and slide along the at least one runner.

23. The crawler vehicle track of claim 20, wherein each of said plugs of said at least one grouser includes a substantially parallelepiped-shaped first portion, and a substantially triangular second portion projecting from the first portion.

24. The crawler vehicle track of claim 20, wherein said at least one grouser includes at least one locking member configured to lock at least one of the plugs along the inner cavity in said first direction.

25. The crawler vehicle track of claim 20, wherein the inner cavity of said at least one grouser includes:
a central portion closed in a third direction which is substantially perpendicular to said first direction and said second direction; and
two lateral portions open in the third direction, wherein each of said plugs is located between the central portion and a relative one of said lateral portions.

26. The crawler vehicle track of claim 20, wherein the inner cavity of said at least one grouser has two lateral ends open in said first direction, and each of the plugs is located at a relative one of said lateral ends.

* * * * *